Patented Nov. 15, 1927.

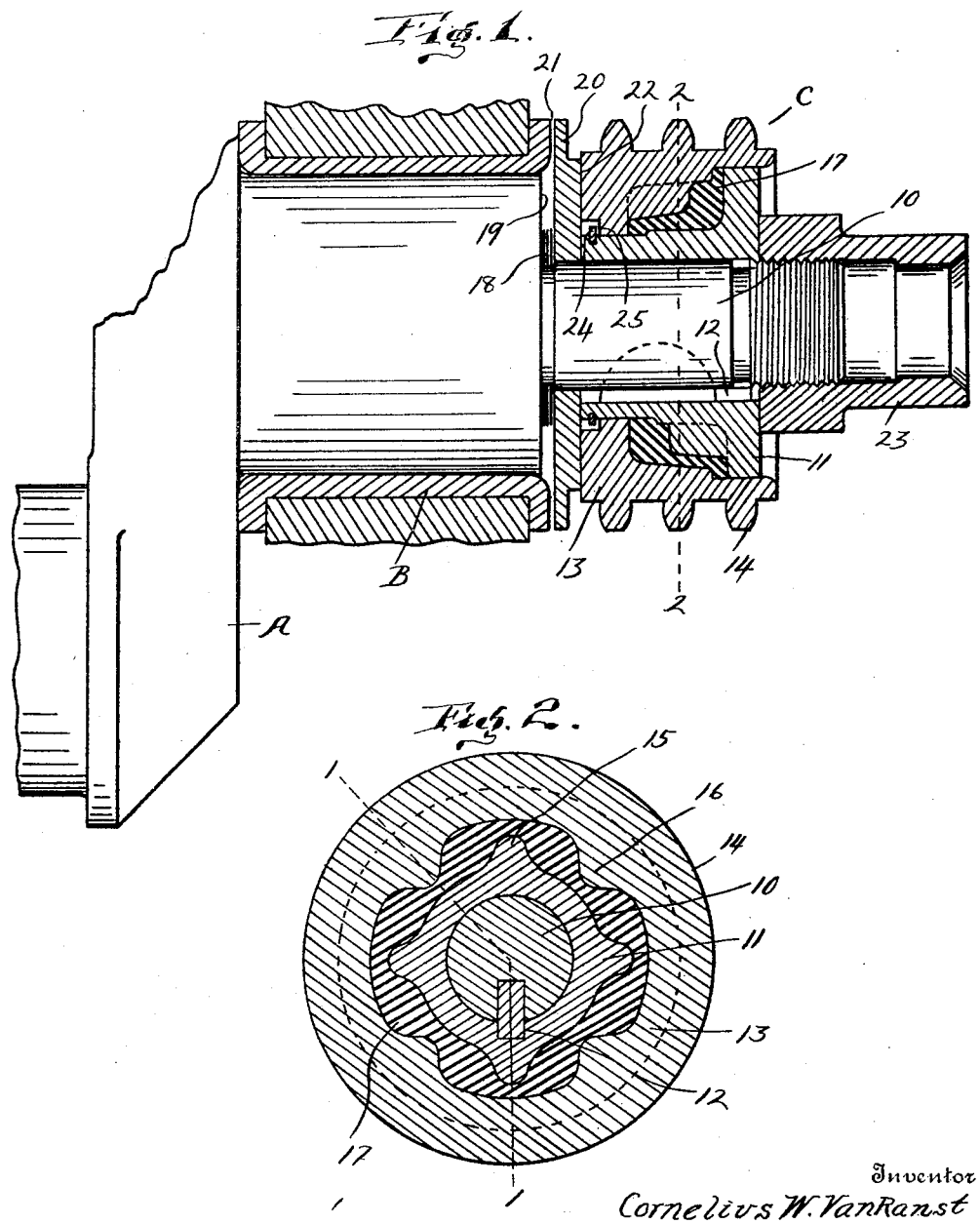

1,649,426

UNITED STATES PATENT OFFICE.

CORNELIUS W. VAN RANST, OF DETROIT, MICHIGAN.

TIMING GEAR FOR INTERNAL-COMBUSTION ENGINES.

Application filed May 25, 1925. Serial No. 32,864.

The invention relates to internal combustion engines and more particularly to an improved timing gear or sprocket for use in obtaining the proper functioning of the ignition valves and other mechanisms ordinarily geared with the crank shaft of the invention. It has been found that the tortional vibration in the crank shaft results in a stretching of the timing chain where a chain is used so as to interfere with the proper functioning of the latter. This invention provides means for preventing the vibrations or fluctuations of the crank shaft from being imparted to the timing chain.

With these and other objects in view, the invention resides in the novel features of construction and combination and arrangements of parts as more fully hereinafter described and claimed.

Referring to the drawings:

Figure 1 represents a fragmentary view of one end of an engine crank shaft showing applied thereto my timing gear or sprocket, the parts thereof being shown in section along the line 1—1 of Figure 2, and Figure 2 is a transverse sectional view of the gear through 2—2 of Figure 1.

Referring to the drawings in which like reference characters indicate corresponding parts, reference character A is one end of an internal combustion engine crank shaft mounted in a bearing B and provided with a shaft extension or projecting portion 10 preferably of reduced diameter. Mounted on the extension 10 is the timing gear or sprocket C which is adapted to drive the ignition valves and other mechanisms ordinarily geared with the crank shaft, the drive being effected by a chain driven from the gear C or through a gear train driven from the gear C.

The timing gear C is preferably composed of a sprocket driving member 11 splined at 12 with the shaft extension 10, and a driven member 13 telescoped over the driving member 11 and axially slidable thereon. The driven member 13 is provided with teeth 14 adapted to drive the timing chain or timing gears (not shown). The driving member 11 and the driven member 13 are formed with the radially projecting lugs 15 and 16 respectively, these lugs being offset from each other so that the lugs of one member project radially within the space provided by adjacent lugs of the other member. 17 indicates an intermediate resilient power or torque transmitting material preferably of a solid yielding character such as rubber or the like. This material is adapted to fill the space afforded by the telescoped members 11 and 13. Annular removable shims 18 are preferably provided for affording a variable abutment against the face 19 of the crank shaft for a hardened plate 20, the latter plate being frictionally engageable with the shaft extension so as to rotate therewith. 21 indicates a clearance space between one face of the plate 20 and the bearing B for accommodating the adjustment of the plate 20 by reason of the shims 18. The other face of the plate 20 frictionally engages the driven member 13 as indicated at 22. 23 represents a nut threaded for engagement with the forward end of the shaft extension 10 for acting against the driving member 11 to compress the yielding material 17 thus tending to axially separate the driving and driven members of the gear C thereby setting up a frictional engagement between the hardened plate 20 and the driven sprocket member 13. For limiting the movement of the driven member 13 axially with respect to the driving member 11 a stop ring 24 carried by the driving member may be provided, the ring being engageable with a shoulder 25 of the driven member. By reason of this stop ring the parts of the timing gear will be held in their assembled relation on removal of the gear from the shaft.

In operation, the shaft extention 10 drives the sprocket driving member 11 and rotation of the latter is transmitted through the yielding material 17 to the driven member 13, the driving being effected by the compression of the yielding material between the radially projecting lugs 15 and 16 of the driving and driven members respectively. When tortional vibrations or fluctuations are set up in the crank shaft the parts operate as follows to prevent such fluctuations from being transmitted to the driven member of the timing gear. The plate 20 being frictionally mounted on the shaft extension and rotatable therewith will move with the crank shaft when a tortional vibration or fluctuation is momentarily set up in the latter. The frictional engagement at 22 between the plate and driven member 13 is of such a character that when the crank shaft fluctuates the plate 20 will slip at its point of engagement 22 with the driven member so that fluctuations of the crank shaft will not be transmitted to the driven member by reason of the plate 20. The effect of the yielding material 17 is such as to establish a yielding drive from the driving member to the driven member, compressing the material 17 for this purpose. When the crank shaft vibrates tortionally the material 17 will be additionally compressed in absorbing to a large extent, the vibration tending to be transmitted from the driving member to the driven member. Such additional compression of the resilient material will tend to increase the speed of the driven parts. Any resilient material has a natural frequency of vibration and if no means were provided to dampen the vibrations, the tortional vibrations of the crank shaft might in certain instances set up vibration of the driven parts in a frequency corresponding with the natural period of vibration of the resilient material. In order to prevent this, the plate 20 is provided, the frictional bearing at 22 tending to slow up any action set up by the resilient material in the nature of the natural period of oscillation as stated above.

Thus the plate 20 acts as a drag or dampener for the driven member when the latter tends to move in either direction with respect to the crank shaft. This dampening action is also further obtained by the rubbing of the resilient material against the walls and other portions of the members 11 and 13. By reason of this construction the proper timing and functioning of the parts driven from the timing gear is provided free from any tortional vibrations or fluctuations.

Before assembling the device on the crank shaft, the stop ring 24 is engaged by the shoulder 25 to limit the relative axial movement of the members 11 and 13. In this position the face 22 of the member 13 will extend slightly beyond the corresponding end face of the member 11. In assembling the gear on the crank shaft, the nut 23 is rotated to move the member 11 into engagement with the plate 20. During this movement the ring 24 is disengaged from the member 11, thus causing the resilient material 17 to establish the frictional pressure at 22 between the plate 20 and the member 13.

While it is preferable to provide the plate 20, I desire to have it understood that the plate 20 may, if desired, be dispensed with.

While I have shown the yielding material 17 in the nature of a solid substance such as rubber or the like I desire to have it understood that springs or other resilient members may be used, although I have found it desirable and advantageous to use a solid yielding material as shown. By the use of the solid material the inertia factor of the springs themselves (should springs be used) is entirely eliminated thus producing a timing gear which will more effectively eliminate the transmission of the vibrations from the crank shaft through the timing gear.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:

1. In combination with a shaft, a gear driven by said shaft and longitudinally adjustable thereon, said gear comprising a driving member fastened to rotate with the shaft and a member driven thereby, and means carried by the shaft and engageable by the driven member upon longitudinal adjustment of the gear for resisting fluctuations of movement between the shaft and the driven member.

2. In combination with a shaft, a gear driven by said shaft and longitudinally adjustable thereon, said gear comprising a driving member fastened to rotate with the shaft and a driven member, means for yieldably driving the driven member from the driving member and means carried by the shaft and engageable with the driven member upon longitudinal adjustment of the gear for resisting fluctuations of movement between the shaft and the driven member.

3. In combination with a shaft, a gear driven by said shaft and longitudinally adjustable thereon, said gear comprising an axially movable driving member fastened to rotate with the shaft, a driven member surrounding the said driving member, yielding means between the driving and driven members, a member carried by the shaft and rotatable therewith, and means for adjusting the gear longitudinally of the shaft to engage the driven member with the said last mentioned member to offer resistance to fluctuations of movement between the shaft and the driven member.

4. In combination with a shaft, a gear driven by said shaft, said gear comprising a driving member, a driven member and yieldable means between said driving and driven members, and a plate carried by said shaft, the said yieldable means tending to urge the driven member into engagement with the said plate to offer resistance to fluctions of movement between the shaft and the driven member.

5. In combination with a shaft, a gear driven by said shaft, said gear including a longitudinally movable driven member, means for limiting the longitudinal movement of the driven member, a driving member fastened to rotate with said shaft and longitudinally adjustable thereon to a position within the driven member and yieldable means for communicating the drive from the driving member to the driven member.

6. In combination with a shaft, a gear driven by said shaft, said gear comprising a driving member fastened to rotate with the shaft, and a driven member, each of said members provided with lugs offset from each other and projecting axially of the shaft, and means in the nature of a solid yielding material between the said offset lugs for communicating the drive from the driving member to the driven member, and a plate carried by the shaft frictionally engageable with the driven member.

7. In combination with a shaft, a gear driven by said shaft, said gear comprising a driving member fastened to rotate with the shaft, and a driven member, each of said members provided with lugs offset from each other and projecting axially of the shaft, and means in the nature of a solid yielding material between the said offset lugs for communicating the drive from the driving member to the driven member, a plate carried by the shaft frictionally engageable with the driven member, and means for moving the driving member axially of the crank shaft and relative to the driven member for compressing the said yielding material and thereby effecting a thrust on the said plate by the driven member.

8. In combination with a shaft, a gear driven by said shaft, said gear comprising a driving member fastened to rotate with the shaft, a driven member, each of said members provided with lugs offset from each other and projecting axially of the shaft, and means in the nature of a solid yielding material between the said offset lugs for communicating the drive from the driving member to the driven member, a plate carried by the shaft frictionally engageable with the driven member, means for moving the driving member axially of the crank shaft and relative to the driven member for compressing the said yielding material and thereby effecting a thrust on the said plate by the driven member, and shims positioned between the plate and a portion of the shaft for adjustably spacing the plate from said portion.

9. In combination with a shaft, a gear driven by said shaft, said gear comprising a driven member fastened to rotate with the shaft, a driven member, each of said members provided with lugs offset from each other and projecting axially of the shaft, and means in the nature of a solid yielding material between the said off-set lugs for communicating the drive from the driving member to the driven member, a plate carried by the shaft frictionally engageable with the driven member, means for moving the driving member axially of the shaft and relative to the driven member for compressing the said yielding material and thereby effecting a thrust on the said plate by the driven member, and a stop ring carried by the driving member for maintaining the driving and driven members in their assembled condition.

10. In combination with a shaft, a gear driven by said shaft, said gear comprising a driving member fastened to rotate with the shaft, and a driven member, yielding means for transmitting the drive from the driving member to the driven member and means mounted on and frictionally driven by the shaft and engaging the said driven member to prevent fluctuations of the shaft from being transmitted to the driven member.

11. The combination with a shaft and a plate on said shaft, of a gear driven by said shaft, said gear comprising a driving member and a driven member, and means carried by said driving member tending to yieldably drive the driven member and to urge the same into engagement with the said plate whereby fluctuations of movement between the shaft and the driven member are prevented.

12. In combination with a shaft, a plate on said shaft and rotatable therewith, a gear driven by said shaft, said gear comprising a driving member and a driven member, means carried by the driving member for yieldably transmitting the drive from the driving member to the driven member and for urging the driven member into engagement with said plate to offer resistance to fluctuations of movement between the shaft and the driven member.

13. In combination with a shaft, a gear driven by said shaft, said gear comprising a driving member fastened to rotate with the shaft, and a driven member, yielding means for communicating the drive from the driving member to the driven member, and a plate rotatable with the shaft and frictionally engaging the driven member offering resistance to fluctuations of movement between the shaft and the driven member, the said yielding means being longitudinally compressible to vary the frictional engagement between the plate and the driven member.

14. In combination, a driving shaft, a driving member splined to said shaft, a driven member mounted on the driving member and axially slidable thereon, means for yieldably communicating motion from the driving member to the driven member, and means rotatable with the driving shaft and frictionally engaging the driven member for resisting fluctuations of movement between the driving shaft and the driven member.

15. In combination, a driving shaft, a driving member fastened to rotate with the driving shaft and longitudinally adjustable thereon, a driven member telescopically mounted on the driving member and axially movable thereon, a compressible member for yieldably communicating the drive from the driving member to the driven member, means rotatable with the shaft and frictionally engaging the driven member for resisting the fluctuations of movement between the shaft and the driven member and means for longitudinally compressing the compressible member for increasing the frictional engagement of the last mentioned means with the driven member.

16. In combination, a driving shaft, a driving member rotatable with the driving shaft, a driven member adapted to be driven by the driving member, a plate rotatable with the driving shaft and frictionally engaging the driven member for resisting fluctuations of movement therebetween, and a member interposed between the driving and driven members for yieldably communicating motion from the one to the other, the said last mentioned member being longitudinally compressible for varying the friction between the plate and the driven member.

In testimony whereof I affix my signature.

CORNELIUS W. VAN RANST.